United States Patent [19]
Karube et al.

[11] Patent Number: 5,060,238
[45] Date of Patent: Oct. 22, 1991

[54] LASER OSCILLATOR DEVICE

[75] Inventors: Norio Karube, Machida; Tsutomu Funakubo, Fujiyoshida, both of Japan

[73] Assignee: Fanuc Ltd, Minamitsuru, Japan

[21] Appl. No.: 455,328
[22] PCT Filed: May 25, 1989
[86] PCT No.: PCT/JP89/00527
    § 371 Date: Jan. 16, 1990
    § 102(e) Date: Jan. 16, 1990
[87] PCT Pub. No.: WO89/12921
    PCT Pub. Date: Dec. 28, 1989

[30] Foreign Application Priority Data

Jun. 24, 1988 [JP] Japan ................. 63-156157

[51] Int. Cl.$^5$ ................................. H01S 3/22
[52] U.S. Cl. ............................ 372/58; 372/59
[58] Field of Search ............................ 372/58, 59

[56] References Cited

U.S. PATENT DOCUMENTS

| | | | |
|---|---|---|---|
| 3,789,320 | 1/1974 | Hepburn | 372/58 |
| 4,351,052 | 9/1982 | Sasaki et al. | 372/58 |
| 4,504,954 | 3/1985 | Guers et al. | 372/58 |
| 4,571,730 | 2/1986 | Mizoguchi et al. | 372/58 |
| 4,578,792 | 3/1986 | Hoag | 372/58 |
| 4,672,622 | 6/1987 | Gürs et al. | 372/58 |
| 4,817,111 | 3/1989 | Nilsen et al. | 372/58 |
| 4,856,007 | 8/1989 | Weiss | 372/58 |
| 4,923,364 | 5/1990 | Nilsen et al. | 372/58 |

Primary Examiner—Léon Scott, Jr.
Attorney, Agent, or Firm—Staas & Halsey

[57] ABSTRACT

A laser oscillator device comprises an electric-discharge tube (1) for producing an electric discharge in a laser gas contained in the electric-discharge tube for laser excitation, an optical resonator (2, 3) for effecting laser oscillation, and a gas circulating device having a gas blower (15) and a cooling unit (8) for forcibly cooling the laser gas. The gas blower (15) has an impeller (16) rotatable in the laser gas. An electric motor for driving the turbo impeller has a stator (20) cooled by thermal contact with a water-cooled medium (25) or an air-cooled medium, and a rotor (19) cooled by contact with a gas flowing between the rotor (19) and the stator (20). The motor for driving the turbo impeller can thus sufficiently be cooled.

2 Claims, 3 Drawing Sheets

LASER OSCILLATOR DEVICE

TECHNICAL FIELD

The present invention relates to a high-power laser such as a machining $CO_2$ laser or the like, and more particularly to an improved turbo blower for use in a $CO_2$ laser.

BACKGROUND ART

FIG. 3 of the accompanying drawings shows a conventional $CO_2$ laser oscillator device. The laser oscillator device includes an electric-discharge tube 1 having an output coupling mirror 2 and a total reflection mirror 3 that are positioned in opposite ends of the electric-discharge tube 1. Metal electrodes 4, 5 are installed on the outer circumference of the electric-discharge tube 1. When a high-frequency voltage is applied between the metal electrodes 4, 5 by a high-frequency power supply 6, a high-frequency glow discharge is produced in the electric-discharge tube 1 for laser excitation. A laser beam axis in the electric-discharge tube 1 is indicated at 13, whereas a laser beam axis extending out of the tube 1 from the output coupling mirror 2 is indicated at 14.

To start the laser oscillator device, a gas in the device is first evacuated by a vacuum pump 12. Then, a valve 11 is opened to introduce a prescribed amount of laser gas from a gas container 10 into the device until the pressure of the gas in the device reaches a predetermined pressure level. Subsequently, the device is continuously evacuated by the vacuum pump 12 and continuously replenished with the laser gas through the valve 11. The laser gas in the device is therefore continuously replaced with a fresh gas while the gas pressure in the apparatus is being kept at the predetermined pressure level. In this manner, the laser gas in the device is prevented from being contaminated.

In FIG. 3, the laser gas is circulated in the device by a roots blower 9 so that the laser gas is cooled. With the $CO_2$ gas laser, about 20% of the applied electric energy is converted into a laser beam, and the rest is consumed to heat the laser gas. According to the theory, however, since the gain of laser oscillation is proportional to the minus (3/2)th power of the absolute temperature T, it is necessary to forcibly cool the laser gas in order to increase the oscillation efficiency. In the illustrated device, the laser gas flows through the electric-discharge tube 1 in the direction indicated by the arrows at a speed of about 100 m/sec. and is introduced into a cooling unit 8. The cooling unit 8 mainly removes the heat energy produced by the electric discharge from the laser gas. Since the gas blower 9 heats the laser gas when it compresses the laser gas, the laser gas from the gas blower 9 is passed through a cooling unit 7 before the laser gas is introduced into the electric-discharge tube 1 again. The cooling units 7, 8 will not be described in detail as they are well known in the art.

The conventional laser oscillator device illustrated in FIG. 3 has the following problems:

The first problem is that since the roots blower is a low-speed volumetric blower, it is large in size and weight, and the laser oscillator itself is large.

According to the second problem, the roots blower sends a pulsating gas flow, and the output power of the laser is affected by the pulsating gas flow.

The third problem is that the roots blower 9 produces a considerable level of vibration which adversely affects the pointing stability of the laser beam.

DISCLOSURE OF THE INVENTION

In view of the aforesaid problems of the conventional laser oscillator device, it is an object of the present invention to provide a laser oscillator device employing a turbo blower.

To achieve the above object, there is provided in accordance with the present invention a laser oscillator device comprising an electric-discharge tube for producing an electric discharge in a laser gas contained in the electric-discharge tube for laser excitation, an optical resonator for effecting laser oscillation, and a gas circulating device having a gas blower and a cooling unit for forcibly cooling the laser gas, characterized in that the gas blower comprises a turbo impeller rotatable in the laser gas and an electric motor for driving the turbo impeller, the electric motor having a stator cooled by thermal contact with a water- or air-cooled medium and a rotor cooled by contact with a gas flowing between the rotor and the stator.

Since the gas blower comprises a turbo blower, its size and weight are small, and the gas discharged by the gas blower is not subject to pulsations.

The stator of the electric motor for driving the turbo impeller is cooled by thermal contact, and the laser gas for cooling the rotor is guided between the rotor and the stator so that the rotor is cooled by the flow of the laser gas. Therefore, the electric motor is prevented from being excessively heated.

BEST MODE FOR CARRYING OUT THE INVENTION

An embodiment of the present invention will hereinafter be described with reference to the drawings.

Figure 1:
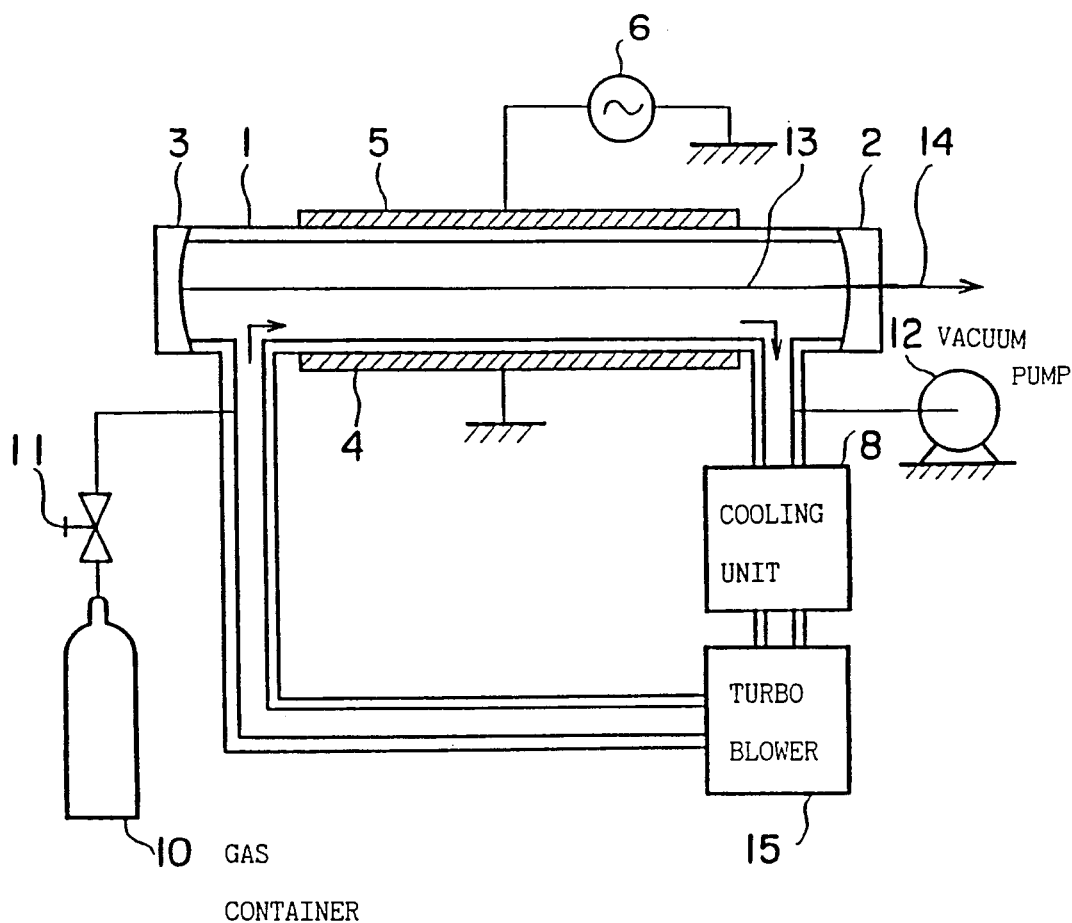
FIG. 1 is a cross-sectional view of a laser oscillator device according to an embodiment of the present invention.
Figure 3:
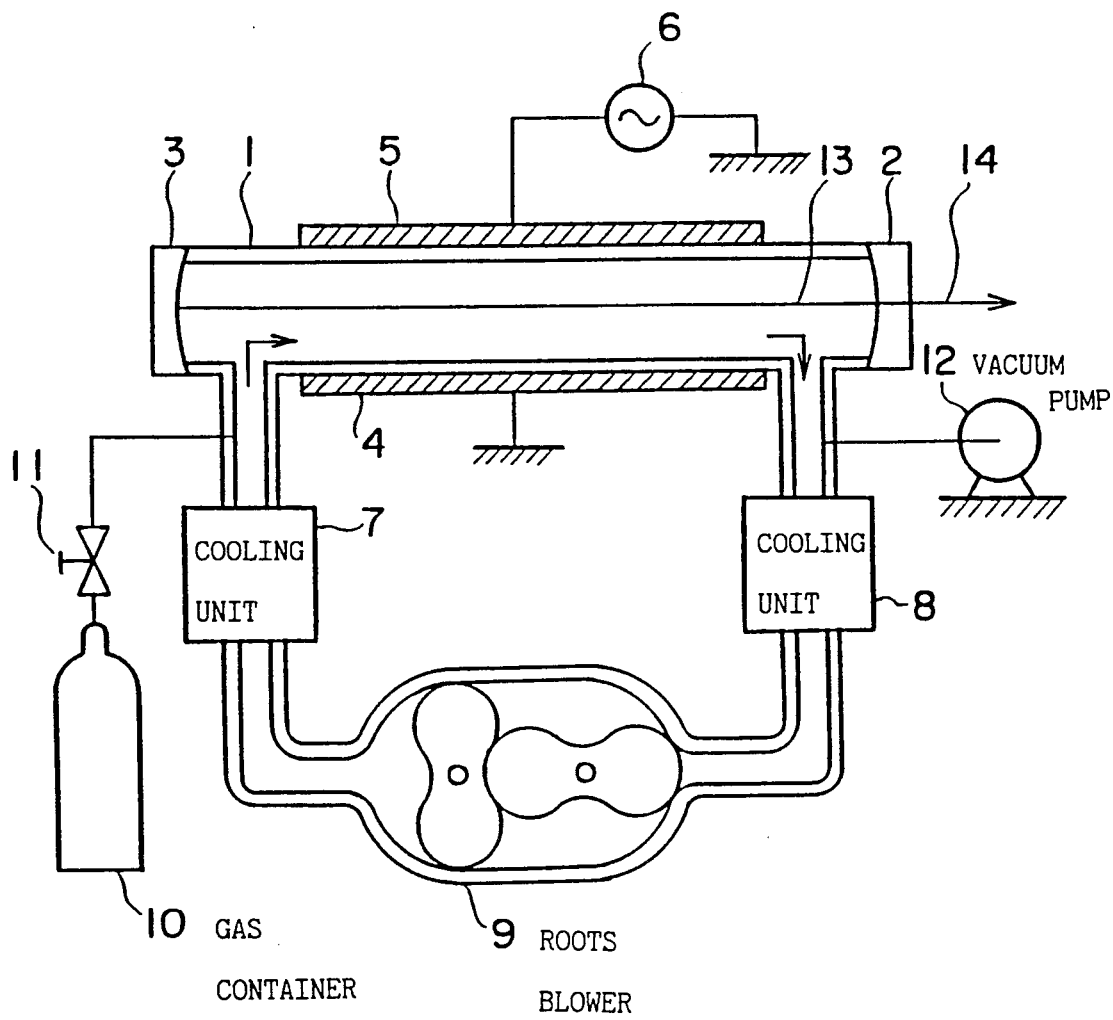
FIG. 3 is a cross-sectional view of a conventional laser oscillator device for a $CO_2$ laser.

FIG. 1 shows a laser oscillator device according to an embodiment of the present invention. Those parts in FIG. 1 which are identical to those of FIG. 3 are denoted by identical reference numerals, and will not be described in detail below. The structure of the electric-discharge tube 1, the high-frequency power supply 6 for exciting the gas, and the supply of a fresh gas from the gas container 10 are identical to those of FIG. 3, and will not be described below. Only those elements which are characteristic of the invention will be described below.

The present invention resides in that a turbo blower 15 is employed in place of the roots blower 9 shown in FIG. 3. Since the turbo blower 15 has a much higher efficiency than the roots blower 9, the heat produced upon compression of the gas is negligible, and hence the cooling unit 7 downstream of the blower as shown in FIG. 3 may be dispensed with. Though no cooling unit 7 is shown in FIG. 1, such a cooling unit may be added.

Figure 2:
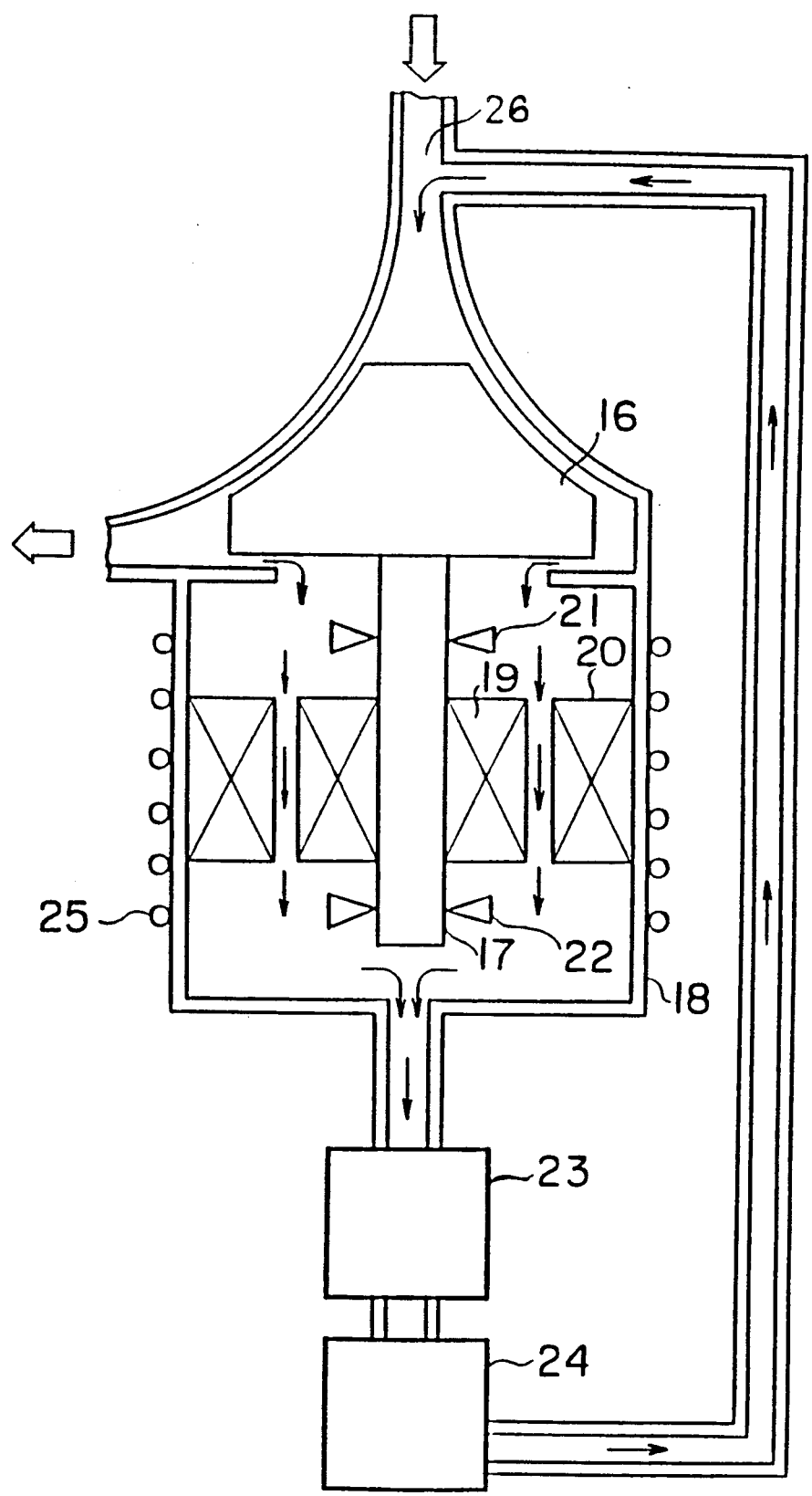
FIG. 2 is a cross-sectional view of a turbo blower.

FIG. 2 shows the structure of the turbo blower. The turbo blower includes a turbo impeller 16. The impeller 16 is shown as being a centrifugal impeller, but may be a mixed flow impeller or an axial-flow impeller. The turbo impeller 16 is mounted on a shaft 17, and rotated at a high speed of about 100,000 RPM by an electric motor comprising a rotor 19 and a stator 20, the motor being disposed in a casing 18 which is separate from a casing in which the laser gas flows. Therefore, the volume of the turbo blower is smaller than that of a roots blower which rotates at a lower speed, the volume being in inverse proportion to the rotational speed. The shaft 17 is supported by bearings 21, 22 with rolling elements, which are lubricated by grease. With the construction of the present invention, the heat produced by the motor requires much consideration. At the high speed of 100,000 RPM, the motor efficiency is normally about 75%. Thus, a motor having an output power of 2 KW causes a loss of 500 W which is responsible for the heating of the rotor 19 and the stator 20. As shown in FIG. 2, the stator 20 is held in close contact with the wall of the casing 18 which is cooled by water cooling pipes 25 for indirectly cooling the stator 20.

It is more difficult to cool the rotor 19 since it rotates at a high speed in the laser gas that is leaner than the atmosphere. The heat of the rotor 19 is transmitted to the shaft 17 to expand the same. When the shaft 17 is expanded, the clearance around the impeller 16 may vary, the bearings may be broken, the grease may be evaporated, the motor efficiency may be lowered, and the motor may be damaged.

According to the present invention, the rotor 19 is forcibly cooled by part of the laser gas flowing around the rotor 19. With a $CO_2$ laser having an output power of 1 KW, when the oscillation efficiency is 20%, the laser oscillator device causes a heat loss of 4 KW, which is carried by the entire laser gas stream that is displaced by the turbo impeller 16. Therefore, it is possible to cool the amount of heat of about 400 W by employing 10% of the entire laser gas stream for cooling the motor. Since the loss produced by the rotor 19 is actually about 12% of the total loss caused by the motor, the amount of the laser gas to flow in the casing 18 may be 1/10 of 10% of the entire laser gas stream. The gas which has been used to cool the rotor is returned to an inlet 26 of the blower through a filter 23 for removing any grease from the laser gas and a flow control valve 24 for controlling the rate of flow of the laser gas. Therefore, the optical parts of the laser oscillator device are prevented from being contaminated by the oil.

The other details than the turbo blower 15 are the same as those shown in FIG. 3. While the roots blower has an efficiency of about 35%, the turbo blower has an efficiency of about 80%. Therefore, the heat generated upon compression of the laser gas is lowered, and any cooling unit downstream of the blower may be dispensed with, or may be much smaller than if the roots blower were employed.

If the impeller of the turbo blower is made of a heat-resistant material such as ceramic or the like, the cooling unit 8 may be dispensed with, and a cooling unit having the same capacity as that of the cooling unit 8 may be located downstream of the blower (at the position of the cooling unit 7 shown in FIG. 3).

The present invention is particularly useful for a high-frequency electric-discharge $CO_2$ laser. If a DC electric discharge is used for laser excitation, then a turbulent flow needs to be produced in the laser gas for a uniform electric discharge. A roots blower is best suited to such an application since the blower requires a high compression ratio. If a high-frequency electric discharge is required for laser excitation, then it is not necessary to provide a turbulent flow in the laser gas, and hence a turbo blower having a low compression ratio and a high discharging capacity is effective as a blower.

With the present invention, as described above, since the gas blower is in the form of a turbo blower, the gas blower is small in size and weight, and the laser oscillator device is also small in size. The cost of the laser oscillator device is lowered as the number of parts is reduced. The efficiency of the blower is increased, the running cost is lowered, the amount of a laser gas to be replaced is reduced for a reduction in the running cost, the laser gas undergoes no pulsation, and the laser output power is not subject to fluctuations.

Since the motor for driving the turbo impeller is cooled, the turbo impeller can be rotated at high speed thereby to sufficiently cool the laser gas, so that the oscillation efficiency of the laser oscillator device can be increased.

We claim:

1. A laser oscillator device comprising an electric-discharge tube for producing an electric discharge in a laser gas contained in the electric-discharge tube for laser excitation, an optical resonator for effecting laser oscillation, and a gas circulating device having a gas blower and a cooling unit for forcibly cooling the laser gas, said gas blower comprising a turbo impeller that is rotatable in the laser gas and an electric motor for driving the turbo impeller, the electric motor having a stator that is cooled by thermal contact with a water- or air-cooled medium and a rotor that is cooled by contact with cooling gas flowing between the rotor and said stator, said gas circulating device including conduit means for directing the flow of said cooling gas between the rotor and the stator.

2. A laser oscillator device according to claim 1, further including a pipe for passage of a gas for cooling said stator and said rotor, and a filter disposed in said pipe for removing grease from said gas.

* * * * *